358-69. XR 2,545,325 SR

X 6501
X 6532

March 13, 1951 P. K. WEIMER 2,545,325

COLOR TELEVISION RECEIVER

Filed Jan. 30, 1948 2 Sheets-Sheet 1

INVENTOR
Paul K. Weimer
BY [signature]
ATTORNEY

March 13, 1951 P. K. WEIMER 2,545,325

COLOR TELEVISION RECEIVER

Filed Jan. 30, 1948 2 Sheets-Sheet 2

INVENTOR
Paul K. Weimer
BY
[signature]
ATTORNEY

Patented Mar. 13, 1951 2,545,325

UNITED STATES PATENT OFFICE 2,545,325

COLOR TELEVISION RECEIVER

Paul K. Weimer, Princeton, N. J., assignor to Radio Corporation of America, a corporation of Delaware Application January 30, 1948, Serial No. 5,431

11 Claims. (Cl. 178—5.4)

This invention relates to color television, and more particularly to arrangements for providing improved reproduction of images in substantially their natural color.

It is generally accepted that the transmission of images in substantially their natural color requires that the image to be transmitted be divided, not only into its image elements, but into selected component color images.

Good results have been obtained by employing separate channels to transmit the separate component color image representative signals in the system popularly known as the "simultaneous" type system. In image reproduction, separate component color image producing devices are then employed in registry to produce an image in its natural color. Such arrangements, however, require accurate registry and more than a single image reproducing device.

It has also been proposed, with what is generally known as the sequential system, to transmit complete component color images sequentially. This latter procedure inherently leads to color flicker and color action fringes, which are objectionable to the extent of seriously reducing the entertainment value of television programs.

It has also been proposed to divide each elemental area of the image to be transmitted into separate and distinct areas of different selected component colors. According to one arrangement, the signal derived from the scanning of such areas is transmitted in the form of an elemental sequential color television signal. The co-pending U. S. application of Arthur Liebscher, Serial No. 4,660, filed January 27, 1948, is such an arrangement.

According to an arrangement shown and described in U. S. Patent 2,431,115, issued to A. N. Goldsmith on November 18, 1947, a color television system is proposed comprising an electron tube having a built-up target area form as a repeating series of strip-like elements of a type suitable for employment in the practice of applicant's invention. According to the Goldsmith patent supra, the target elements of each series are of materials adapted to fluoresce upon electron impact in each of a predetermined number of component colors to provide additive color images. Means are provided to moduate the deflected electron beam in sequence under control of separate video signals equal in number to and representative of each of the selected component colors of the additive color system to provide intensity control of the color response in each color. Means are provided for developing beam control energy having a predetermined relationship to the line frequency at which reduced color images are to be developed, to limit the periods of active beam response and separation. Means are also provided to generate from the control energy a series of control pulses out of phase with respect to each other by predetermined amounts, and means for utilizing the said phase shift of pulses are employed to control the time periods during which signals representative of the several component colors are applied to control the image production.

It is to this sort of color image reproducing arrangement that the present invention is directed.

According to the present invention, it is desired to convert from a simultaneous type color signal to an elemental sequential type signal for image reproduction. The elemental sequential rate is chosen and automatically synchronized with the scanning beam of the reproducing tube in such a manner that any irregularities in form or speed of the scanning operation do not prevent substantially perfect registration.

According to the present invention, a simultaneous type color television signal is employed for the transmission of the image intelligence, and at the receiving station a series of switches converts the simultaneous type color signal into an elemental sequential type color signal and applies it to the control electrode of an image reproducing tube, which has a special ruled color filter screen consisting of repeating, adjacently positioned and similar sized and arranged groups of adjacently positioned strip-like sections of component color reproducing areas. Each group of sections includes at least one section representing each of the selected component colors. The action of the switches is controlled by a pulse forming arrangement consisting of an electrical device which forms a pulse each time a group is scanned. An appropriate pulse delay arrangement is employed to control the switch sequentially to correspond with the appropriate color representative strip-like section of the screen.

A primary object of this invention is to provide for improved reproduction of television images in substantially their natural color.

Another object of this invention is to provide for reproduction of color television images without registration problems.

Other and incidental objects of the invention will be apparent to those skilled in the art from a reading of the following specification and an inspection of the accompanying drawing in which.

Figure 1:
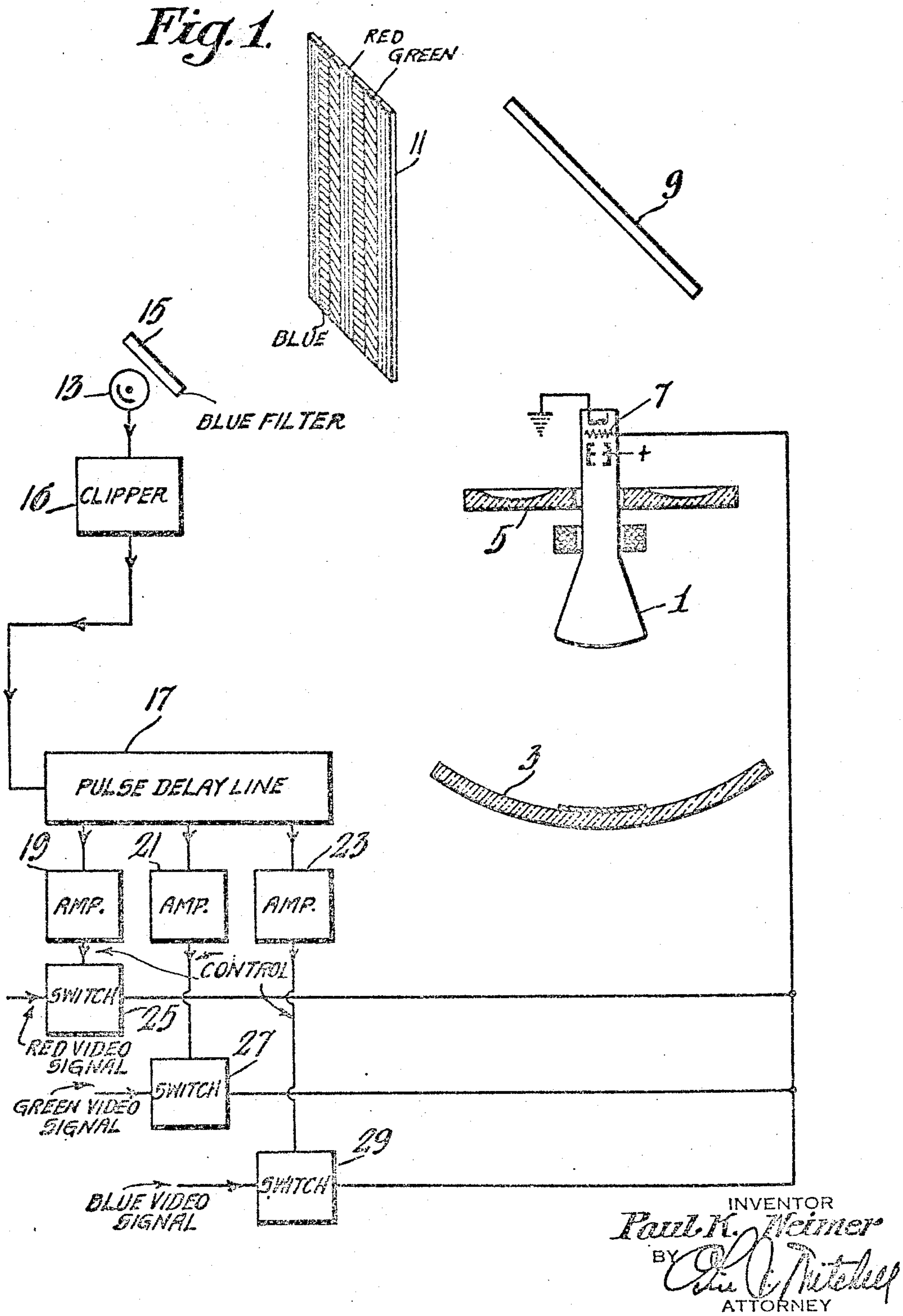
Figure 1 shows by block diagram one form of this invention.

Turning now in more detail to Figure 1, there is shown, as illustrative of one form of this invention, a projection type image reproducing tube 1 and its associated reflector 3 and correction plate 5. The theory and operation of such an image forming arrangement is quite well known to the television art and is well shown and described in the article entitled "Projection Television," by D. W. Epstein and I. G. Maloff, published in the "Journal of the Society of Motion Picture Engineers" for June, 1945.

The projection tube 1 includes a control electrode 7 for varying the intensity of the scanning beam in accordance with the incoming signal. The projection tube 1 also includes appropriately designed deflection coils and beam forming electrodes, which are omitted from the drawing for simplification. They may take any of the well known forms.

The projection tube 1 has associated therewith the usual reflecting mirror 9 employed to reflect light from the image tube 1 on a specially designed screen 11.

The screen 11 consists, in accordance with one form of this invention, of repeating, adjacently positioned and similar sized and arranged groups of adjacently positioned strip-like sections of component color reproducing areas. Each group of sections includes a pulse forming member and at least one section representing each of the selected component colors.

In the form of the invention shown in Figure 1, the pulse forming member takes the form of one of the component color reproducing areas, such as, for example, the blue sections, as designated.

It will seen that if the blank scanning raster is produced by projection tube 1, a light sensitive device 13 positioned behind a blue filter element 15 and in the close proximity of the screen 11 will reproduce a pulse each time the blue section of screen 11 is traversed by the spot of light caused by the scanning beam tube 1.

According to one form of the invention, a suitable bias is always applied to control electrode 7 so that even in black areas of the image a very low current intensity beam will be generated. This will insure, even for images containing a large black area, that synchronism is maintained. The bias control electrode 7 may be so small as not to interfere with the image to any perceptible degree.

The signal pulses formed in light sensitive device 13 are applied through signal clipper 16 to a pulse delay arrangement designated in Figure 1 as a delay line 17.

Figure 2:
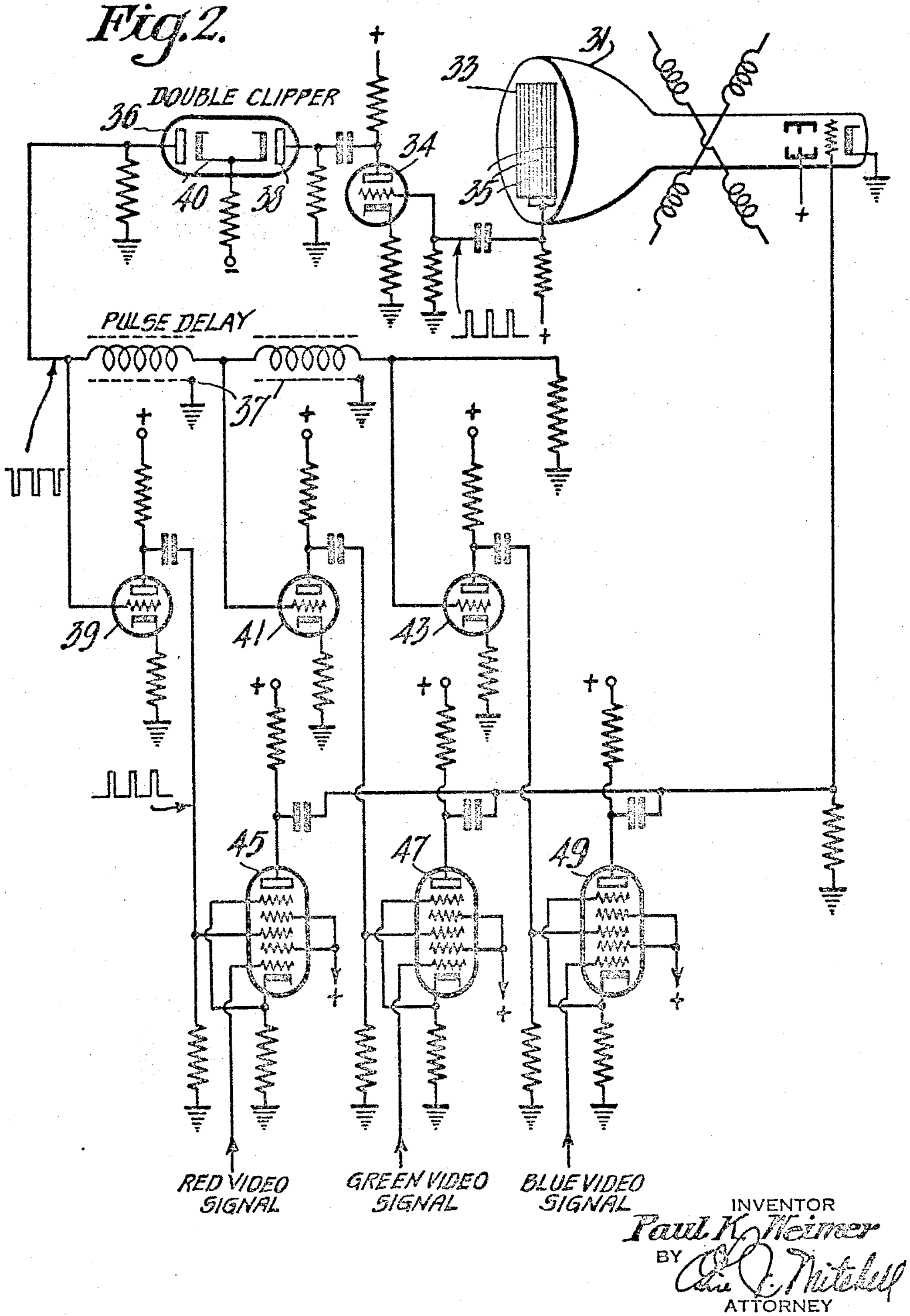
Figure 2 shows by circuit diagram another form of this invention.

The clipper 16, although not essential, may take any of the well known forms, such as, for example, the clipper circuit involving tube 36, shown in detail in Figure 2.

The pulse delay line 17 may also take any of the well known forms, such as, for example, the pulse delay arrangement suggested in the article entitled "Video Delay Lines," beginning on page 1580 of the "Proceedings of the Institute of Radio Engineers" for December 1947. Popular circuit arrangements for producing signal delay are also suitable for employment in the practice of this invention.

Pulse amplifiers 19, 21 and 23 are connected at appropriate points in pulse delay line 17 in order to appropriately control switches 25, 27 and 29 such that only one of the component color video signals is passed to the control electrode 7 of projection tube 1. The connections of the amplifiers 19, 21 and 23 to pulse delay line 17 are arranged so that the red video signal is applied to control electrode 7 during the interval of time that the scanning beam of projection tube 1 produces a spot of light in the red filter sections of screen 11.

Likewise, switch 27 is made operable to pass the green video signal during that time interval in which the flying spot caused by the scanning beam of projection tube 1 is traversing the green filters of the projection screen 11. Likewise, the blue video signal is passed through switch 29 to the control electrode 7 of the projection tube 1 during the time intervals that the flying spot is traversing the blue sections of screen 11.

Although not shown, the red, green and blue video signals may be obtained from a suitable color television signal receiver such as that shown and described, for example, in an article entitled "An Experimental Simultaneous Color Television System," beginning on page 861 of the "Proceedings of the Institute of Radio Engineers" for September 1947.

Amplifiers and switches suitable for employment in blocks 19, 21, 23, 25, 27 and 29 are shown and described in detail in Figure 2.

Turning now in more detail to Figure 2, there is illustrated another form of this invention involving an image reproducing tube 31 involving the usual beam forming and deflecting arrangement customarily associated with cathode ray tubes suitable for employment in television systems.

The image screen 33 of tube 31 is specially constructed of repeating, adjacently positioned and similar sized and arranged groups of adjacently positioned strip-like sections of component color reproducing areas. Each group of sections includes a pulse forming member which, in this form of the invention, consists of a group of conductors 35 exposed to the scanning beam of the tube 31.

A form of tube having a laminated color-striped target area formed from suitable compounds which luminesce in desired selected component colors has been disclosed in U. S. Patent 2,310,863, granted on February 9, 1943, to H. W. Leverenz.

Each time the scanning beam traverses one of the conductors 35, a pulse is formed which is amplified and inverted in tube 34. The inverted pulse is then clipped in the clipper circuit involving tube 36 and transmitted to the pulse delay arrangement consisting of delay line 37. Clipper tube 36 operates to clip both top and bottom of the pulse signal applied to its anode 38. Common cathode 40 is appropriately biased to furnish a pulse of desired amplitude to the pulse delay arrangement 37. Amplifier tubes 39, 41 and 43 are appropriately tapped to pulse delay arrangement 37 to key switching tubes 45, 47 and 49 to operate to pass component color video signals one at a time, sequentially, and in synchronism with the scanning operation of the appropriately color designated strip-like elements in screen 33.

In the arrangement shown in Figure 2, the red, green and blue video signals, as indicated, may be obtained from a color television receiver of any of the types suitable for producing the simultaneous type color television signal.

Through the use of the present invention, it is possible to produce a complete color television image by a single electron beam and at a single image surface. The image surface or screen comprises a series of very thin, closely adjacent and differently colored (as, for example, red, blue and green) filter strips extending in a direction preferably perpendicular to the direction of line scanning. Simultaneous type color television signals are employed including, for example, three series of signals representing the red, blue and green color components of the subject matter transmitted. These three series of signals are not used simultaneously, but at any one instant only one series is used. The current intensity of the cathode ray beam in the kinescope is modulated by the three series of signals in sequence, the switching between the three series of signals being very rapid and controlled at the receiver by impulses generated, directly or indirectly, by the kinescope cathode ray beam. Video signals representing any one of the three colors are then applied to the control electrode of the gun structure in the kinescope when the generated cathode ray beam is in a position to produce light of a corresponding color. When the color strips are made sufficiently thin, a complete color television image results.

Having thus described the invention, what is claimed is:

1. A color television image reproducing system comprising in combination an image screen having a plurality of repeating, adjacently positioned and similar groups of vertical strip-like sections, each strip-like section of a group limited in its light representation to one different selected component color, an electron scanning beam for developing an image on said screen by a scanning operation, said electron scanning beam having an intensity control electrode, means for developing a keying pulse upon the scanning of the same relative horizontal position in each of said groups of strip-like sections, a pulse delay arrangement electrically connected to said means for developing a keying pulse, an electrical switch for each of said different selected component colors, each of said electrical switches having an input and output circuit, said output circuits controllably connected to said scanning beam intensity control electrode, a source of color television image signals representative of each different component color of an image, said input circuits connected to said source, and a control connection between said electrical switches and said pulse delay arrangement to control said switches to pass signals representative of one component color at a time, sequentially and in synchronism with the scanning of the appropriately color designated strip-like elements.

2. A color television image reproducing system comprising in combination an image screen having a plurality of repeating, adjacently positioned and similar groups of substantially vertical strip-like sections, each strip-like section of a group limited in its light representation to one different selected component color, a light sensitive element positioned adjacent to said screen to receive light therefrom, said light sensitive element responsive to one only of said component colors, an electron scanning beam for developing an image on said screen by a scanning operation, said electron scanning beam having an intensity control electrode, a pulse delay arrangement electrically connected to said light sensitive device, an electrical switch for each of said different selected component colors, said electrical switches having an input and output circuit, said output circuits connected to said scanning beam intensity control electrode, each of said input circuits adapted to receive independent image signals representative of a different component color and of the same component color to which the associated switch is designated, and a control connection between said electrical switches and said pulse delay arrangement to sequentially control said switches to pass signals representing one color at a time and in synchronism with the scanning of the appropriately color designated strip-like element.

3. A color television image reproducing system comprising in combination an image screen adapted to be scanned by an electron beam and having a plurality of repeating, adjacently positioned and similar groups of strip-like sections having their longest dimension in a direction different than the direction of the scanning lines of said scanning electron beam, each strip-like section of a group limited in its light representation to one different selected component color, an electrical conductor in the same relative position in each of said groups of strip-like sections, an electron scanning beam for developing an image on said screen by a scanning operation, said electron scanning beam having an intensity control electrode, a pulse delay arrangement electrically connected to said electrical conductors, an electrical switch for each of said different selected component colors, each of said electrical switches having an input and output circuit, said output circuits connected to said scanning beam intensity control electrode, a source of image signals of each of said component colors, said input circuits adapted to receive image signals representative of a component color image of the same component color to which the associated switch is designated, and a control connection between said electrical switches and said pulse delay arrangement to control said switches to pass signals one at a time, sequentially and in synchronism with the scanning of the appropriately color designated strip-like element.

4. A color television image reproducing system comprising in combination an electron scanning beam target having a plurality of repeating, adjacently positioned and similar groups of vertical strip-like light emitting sections, each strip-like section of a group limited in its light emission upon activation by an electron scanning beam to one different selected component color, said electron scanning beam having an intensity control electrode, means for developing a keying pulse upon the scanning of each of said groups of strip-like sections by said electron scanning beam, a pulse delay arrangement electrically connected to said means for developing a keying pulse, an electrical switch for each of said different selected component colors, said electrical switches each having an input and output circuit, said output circuits connected to said scanning beam intensity control electrode, said input circuits adapted to receive simultaneous type image signals representative of a component color image, the same component color to which the associated switch is designated, and a control connection between said electrical switches and said pulse delay arrangement to control said switches to pass signals one at a time, sequentially and in synchronism with the scanning of the appropriately color designated strip-like element.

5. A color television image reproducing system comprising in combination an image screen having a plurality of repeating, adjacently positioned and similar groups of vertical strip-like light filter sections, each strip-like section of a group limited in its light transmission to one different selected component color, an electron scanning beam for developing an image on said screen by a scanning operation, said electron scanning beam having an intensity control electrode, means for developing a keying pulse upon the scanning of each of said groups of strip-like sections by said electron scanning beam, a pulse delay arrangement electrically connected to said means for developing a keying pulse, an electrical switch for each of said different selected component colors, said electrical switches each having an input and output circuit, said output circuits connected to said scanning beam intensity control electrode, said input circuits adapted to receive image signals representative of a component color image, the same component color to which the associated switch is designated, and a control connection between said electrical switches and said pulse delay arrangement to control said switches to pass signals one at a time, sequentially and in synchronism with the scanning of the appropriately color designated strip-like element.

6. A color television image reproducing system comprising in combination an image screen having a plurality of repeating, adjacently positioned and similar groups of vertical strip-like sections of selected component color representative materials and wherein each group of said sections includes at least one section representative of the substantially red color component, the substantially blue color component and the substantially green color component, an electron scanning beam for developing an image on said screen by a scanning operation, said electron scanning beam having an intensity control electrode, a light sensitive element positioned adjacent to said screen to receive light therefrom, said light sensitive element responsive to one only of said component colors, a pulse delay arrangement electrically connected to said light sensitive device, an electrical switch for each of said different selected component colors, each of said electrical switches having an input and output circuit, said output circuits controllably connected to said scanning beam intensity control electrode, said input circuits adapted to receive image signals representative of a component color image of the same component color to which the associated switch is designated, and a control connection between said electrical switches and said pulse delay arrangement to control said switches to pass signals one at a time, sequentially and in synchronism with the scanning of the appropriately color designated strip-like element.

7. A color television image reproducing system comprising in combination an image screen having a plurality of repeating, adjacently positioned and similar groups of vertical strip-like sections of selected component color representative materials and wherein each group of said sections includes at least one section representative of the substantially red color component, the substantially blue color component and the substantially green color component, an electron scanning beam for developing an image on said screen by a scanning operation, said electron scanning beam having an intensity control electrode, a light sensitive element positioned adjacent to said screen to receive light therefrom, said light sensitive element responsive to only said substantially blue component color, a pulse delay arrangement electrically connected to said light sensitive device, an electrical switch for each of said different selected component colors, said electrical switches each having an input and output circuit, said output circuits connected to said scanning beam intensity control electrode, said input circuits adapted to receive image signals representative of a component color image, the same component color to which the associated switch is designated, and a control connection between said electrical switches and said pulse delay arrangement to control said switches to pass signals one at a time, sequentially and in synchronism with the scanning of the appropriately color designated strip-like elements.

8. A color television image reproducing system comprising in combination an image screen having a plurality of repeating, adjacently positioned and similar groups of strip-like sections, each strip-like section of a group limited in its light representation to one different selected component color, means for developing a keying pulse upon the scanning of the same relative horizonal position in each of said groups of strip-like sections, an electron scanning beam for developing an image on said screen by a scanning operation having scanning lines in a direction other than the direction of the longest dimension of said strip-like sections, said electron scanning beam having an intensity control electrode, a pulse delay arrangement electrically connected to said means for developing a keying pulse, an electrical switch for each of said different selected component colors, said electrical switch having an input and output circuit, said output circuits connected to said scanning beam intensity control electrode, said input circuits adapted to receive image signals representative of a component color image, the same component color to which the associated switch is designated, and a plurality of pulse delay arrangements, said pulse delay arrangements controllably connected between said electrical switches and between one of said electrical switches and said means for developing a keying pulse to control said switches to pass signals one at a time, sequentially and in synchronism with the scanning of the appropriately color designated strip-like elements.

9. A color television image reproducing system comprising in combination an image screen having a plurality of repeating, adjacently positioned and similar groups of vertical strip-like sections, each strip-like section of a group limited in its light representation to one different selected component color, means for developing a keying pulse upon the scanning of the same relative horizontal position in each of said groups of strip-like sections, an electron scanning beam for developing an image on said screen by a scanning operation, said electron scanning beam having an intensity control electrode, a pulse delay arrangement electrically connected to said means for developing a keying pulse, an electrical switch for each of said different selected component colors, said electrical switch having an input and output circuit, said output circuits connected to said scanning beam intensity control electrode, said input circuits adapted to receive image signals representative of a component color image, the same component color to which the associated switch is designated, and a plurality of pulse delay arrangements, said pulse delay arrangements controllably connected between said electrical switches to control said switches to pass signals one at a time, sequentially and in synchronism with the scanning of the appropriately color designated strip-like elements.

10. A method for the reproduction of images in substantially their natural color, comprising the steps of developing an image forming scanning beam, forming a scanning raster with said scanning beam, forming repeating, adjacently positioned and similar sized and arranged groups of adjacently positioned strip-like sections of component color areas, and wherein each group of sections includes a pulse forming member and at least one section representing each of the selected component colors, controlling the intensity of said scanning beam by selectively switching different component color image signals one at a time, sequentially and in synchronism with the scanning action of said scanning beam on said strip-like sections of component color reproducing areas, developing a train of pulses from said scanning action, and delaying said pulses to control said switching process.

11. A method for the reproduction of images in substantially their natural color, comprising the steps of developing an image forming scanning beam, deflecting said scanning beam across repeating, adjacently positioned and similar sized and arranged groups of adjacently positioned strip-like sections of component color reproducing areas including at least one section of each of the selected component colors, forming a pulse each time said scanning beam traverses a group of said strip-like sections of component color reproducing areas, controlling the intensity of said scanning beam by selectively switching different component color image signals one at a time, sequentially and in synchronism with the scanning action of said scanning beam on said strip-like sections of component color reproducing areas, and delaying said pulses to control said switching process.

PAUL K. WEIMER.

REFERENCES CITED

The following references are of record in the file of this patent:

UNITED STATES PATENTS

| Number | Name | Date |
|---|---|---|
| 2,296,908 | Crosby | Sept. 9, 1942 |
| 2,309,506 | Herbst | Jan. 26, 1943 |
| 2,415,509 | Zworykin | Jan. 28, 1947 |
| 2,423,769 | Goldsmith | July 8, 1947 |
| 2,431,115 | Goldsmith | Nov. 18, 1947 |